Nov. 27, 1962 W. W. WHITE ETAL 3,066,014
COOL GAS GENERATOR
Filed April 18, 1958 5 Sheets-Sheet 1

INVENTORS:
Warren W. White
Starr W. Cahill

Attorney

Nov. 27, 1962    W. W. WHITE ETAL    3,066,014
COOL GAS GENERATOR
Filed April 18, 1958    5 Sheets-Sheet 2

Warren W. White
Starr W. Cahill
INVENTORS

BY

ATTORNEY

Nov. 27, 1962 W. W. WHITE ETAL 3,066,014
COOL GAS GENERATOR
Filed April 18, 1958 5 Sheets-Sheet 3

Warren W. White
Starr W. Cahill
INVENTORS

BY

ATTORNEY

Nov. 27, 1962 W. W. WHITE ETAL 3,066,014
COOL GAS GENERATOR

Filed April 18, 1958 5 Sheets—Sheet 4

Warren W. White
Starr W. Cahill
INVENTORS

BY *Forrest Filby*

ATTORNEY

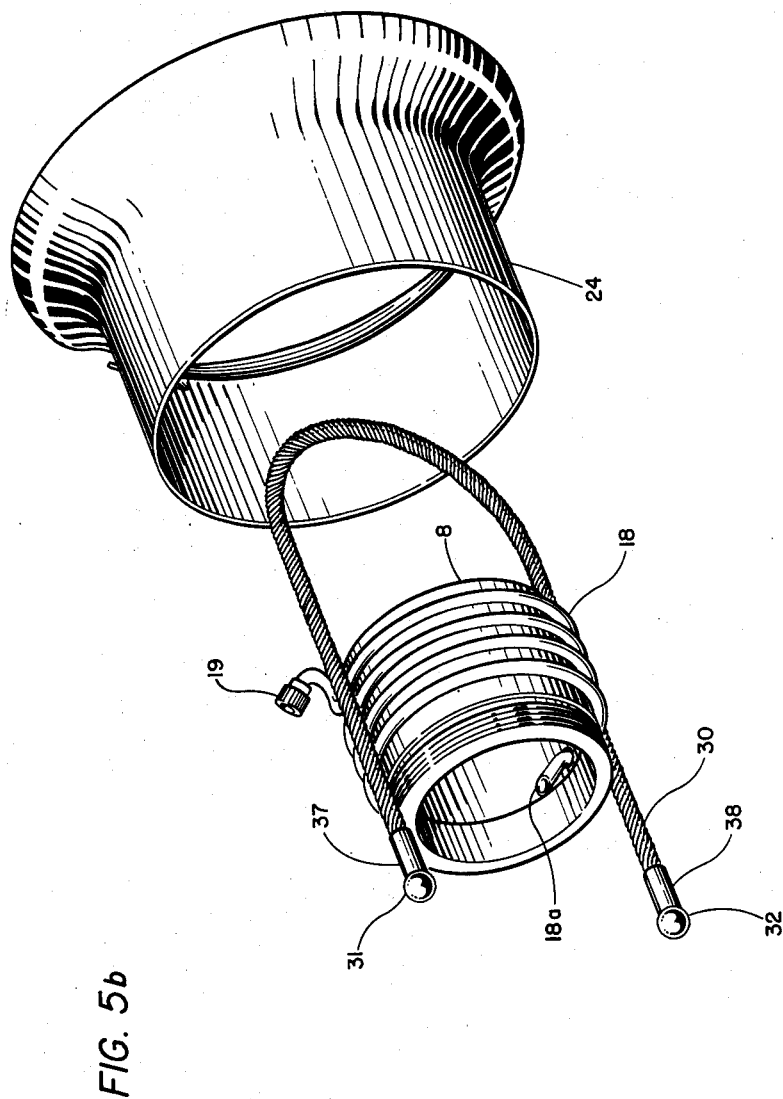

United States Patent Office

3,066,014
Patented Nov. 27, 1962

3,066,014
COOL GAS GENERATOR
Warren W. White, Sierra Madre, and Starr W. Cahill, Arcadia, Calif., assignors to Hycon Mfg. Company, Pasadena, Calif., a corporation of Delaware
Filed Apr. 18, 1958, Ser. No. 729,461
4 Claims. (Cl. 23—281)

Our invention relates generally to gas generators and more particularly to a new and useful cool gas generator.

Compressed carbon dioxide is a common source of inert gas which is widely used, for example, in inflating rubber life rafts. This type of gas source is not, however, as reliable as is desired because carbon dioxide is subject to freezing at low temperatures. The expansion of the gas during inflation of the life raft, for example, further enhances the likelihood of freezing. Another difficulty found with compressed carbon dioxide is that of container leakage and consequent loss of pressure which is almost impossible to avoid over any extended period of time. Compressed carbon dioxide does, however, provide an immediate supply of gas, under proper conditions, which can be compactly stored.

It is an object of our invention to provide a reliable gas generator which is operable at extremely low temperatures and which has no leakage or loss of pressure problems.

Another object of our invention is to provide a gas generator which is a source of relatively cool gas useful for inflating rubber articles such as life rafts and the like.

A further object of the invention is to provide an exceptionally compact gas generator capable of producing large volumes of gas in a short time duration and at low temperatures.

Briefly, and in general terms, the foregoing and other objects are preferably accomplished by providing a comparatively slow burning source of gas (as contrasted with an explosive source) which can be electrically ignited and is contained in a housing enclosed by a dome structure. The space between the dome structure and inner housing is suitably packed with, for example, copper wool which can be separated by a copper baffle, and the dome structure in respect to the inner housing and its gas source is such as to direct gas through the copper wool to an outlet including one end of a connecting copper tubing provided in a helical coil encircling the dome. The other end of the copper tubing is coupled to, for example, a rubber tube through a conventional air valve. Thus, extremely hot gas is passed through a compact structure including copper wool and copper tubing and is cooled sufficiently to inflate a rubber tube.

Our invention possesses other objects and features, some of which, together with the foregoing, will be set forth in the following detailed description of a preferred embodiment of the invention, and the invention will be more fully understood by reading the description with joint reference to the attached drawings, in which:

FIGURES 5a and 5b, together, comprise an exploded view of a preferred embodiment of our invention.

Figure 1:
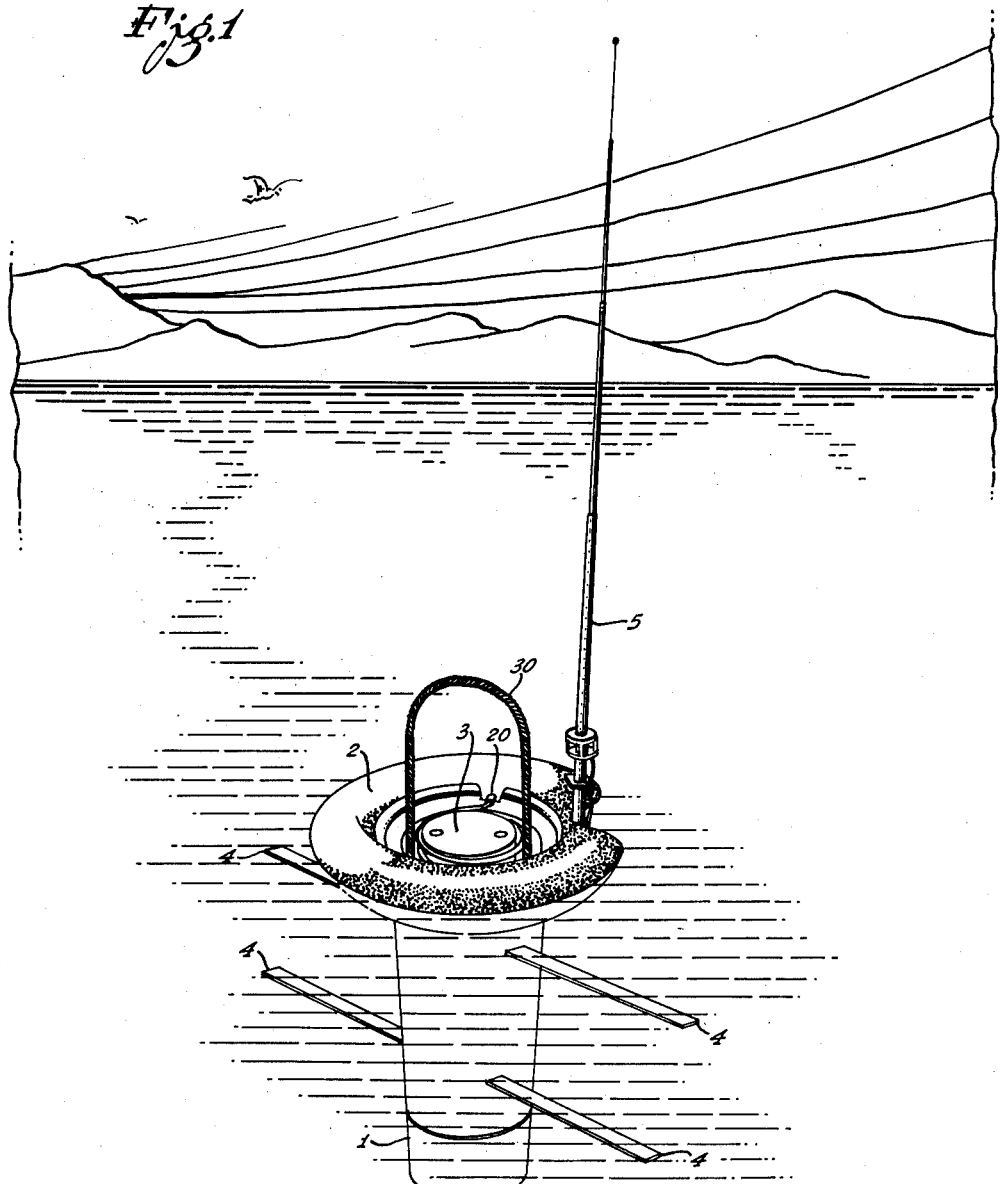
FIGURE 1 is a drawing showing an application of our invention in a crash locator beacon.

An application of our invention is pictorially demonstrated in FIGURE 1. Here, a crash locator beacon 1 is shown supported in water by a rubber tube 2 which has been inflated by a centrally mounted cool gas generator 3.

Generally, the crash locator beacon 1 includes a hermetically sealed battery (not shown) which is activated when the locator beacon is ejected from an aircraft, for example, and supplies electrical power to the gas generator 3 and to a timer control device (not shown) which programs a sequence of automatic operations. In this instance, electrical power is provided directly and immediately to the cool gas generator 3, energizing the generator to produce cool gas which is used to inflate the rubber tube 2. Firing of the generator automatically breaks the igniting circuit as described later. The timer control device subsequently directs power to an actuator which extends first the stabilizing vanes 4 and then antenna 5. The rubber tube 2 in this example is pre-formed with a notched area which provides clearance for the antenna 5. A transmitter is then energized for the remaining life of the battery, and feeds a suitable output signal to the antenna 5 which radiates the signal omnidirectionally.

Figure 3:
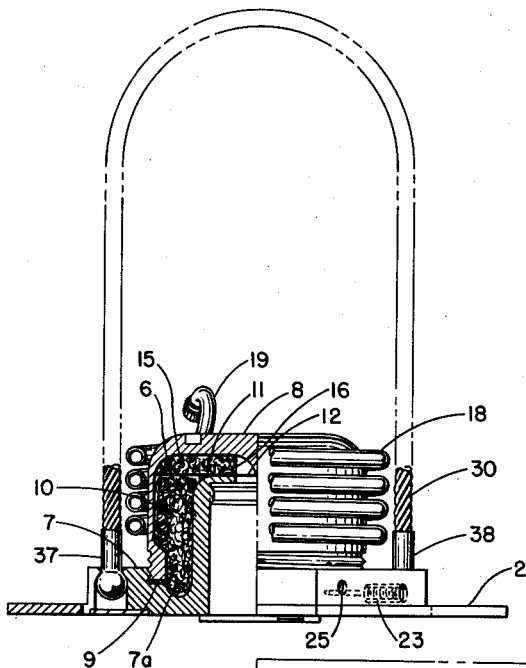
FIGURE 3 is an elevational side view, partially in cross section, of the invention as shown in FIGURE 2 and viewed along the line 3—3.
Figure 2:
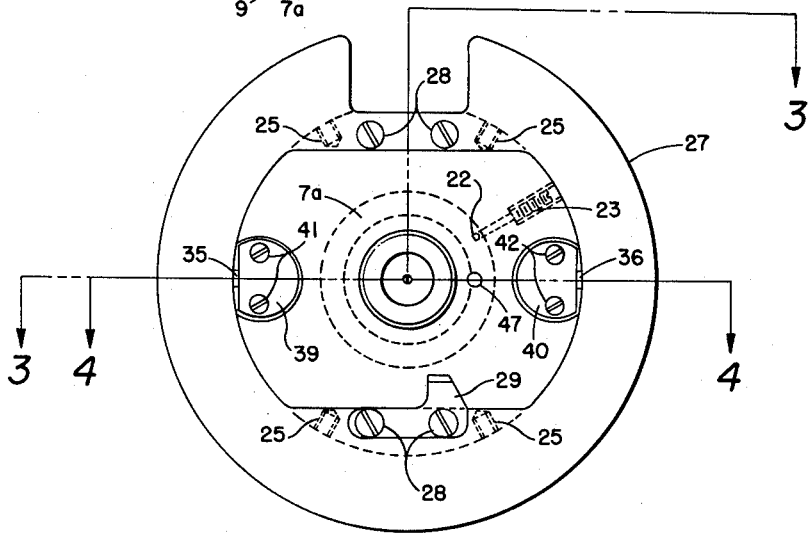
FIGURE 2 shows a bottom plan view of a preferred embodiment of our invention.

A preferred embodiment of our invention is generally illustrated by the drawings of FIGURES 2 and 3. FIGURE 2 is a bottom plan view of a cool gas generator, less squib, and FIGURE 3 is an elevational side view, which is partly sectional, taken along the line 3—3 as indicated in the drawing of FIGURE 2. The invention comprises an inner, cylindrical squib housing 6 having a normally lower flange base 7 which is grooved around the outside of the housing at the bottom, and the laterally outermost side of the groove 7a is suitably threaded (internally) to receive an outer dome 8, a shoulder ledge 9 as shown in FIGURE 3 being produced and left by the threading operation. The space between the inner housing 6 and the outer dome 8 from the top of the housing down is tightly packed with copper wool 10 having a high specific heat constant. A thin, circular disc baffle 11 is positioned on top of the packed copper wool 10 level with the upper end surface of the inner housing 6. The baffle 11 is preferably fabricated from sheet copper and has a central opening 12 and three equidistantly spaced, peripheral sector notches 13 as shown in FIGURE 5a. The central opening 12 coincides with an opening 14 centrally located in the top end of the inner housing 6 (FIGURE 4).

The space above the baffle 11 to dome 8 is generally filled by a shaped copper wool pad 15 which is in the form of a thick circular disc having a central opening 16 matching those of baffle 11 and housing 6. The normally upper edge of the pad 15 is rounded to conform with the contour of the internal top edge of the dome 8. The central opening 16 accommodates a hypocycloidal cone 17 having an axis of revolution which is aligned with the centers of the inner housing opening 14 and central baffle opening 12, coinciding with the axis of the cylindrical housing 6. The hypocycloidal cone 17 is pendent from the inside center of dome 8 and serves to deflect gas discharging from opening 14 laterally and uniformly into copper wool pad 15. The baffle 11 distributes the gas evenly through its equally spaced, peripheral sector notches 13 down into the packed copper wool 10. More than one baffle can be used to distribute the gas evenly; however, just one was found to be adequate.

A helically wound copper tubing 18 concentrically encircles the dome 8 near the outer surface of the dome. Four or five turns of 3/16 inch copper tubing provided in a 3¼ inch diameter helix is used in the preferred example. The lower end of the tubing 18 passes through a close tolerance hole drilled in the lower side of the dome 8 and extends downwards close against the dome wall, terminating in a steeply slanting elliptical opening 18a which normally lies substantially in the groove 7a around the housing 6 and faces inwards toward the inner housing wall. This is more clearly shown in FIGURE 5b, and in FIGURE 4 which is an enlarged, sectional view of the invention taken along the line 4—4 as shown in FIGURE 2. The tubing 18 is brazed to the dome 8 around the drilled hole so as to be fully gas tight. The other end of the tubing 18 is bent angularly outwards and is affixed with a knurled coupling nut 19 which normally threads onto the stem of valve jacket 20 (FIGURE 1), that houses a conventional air valve, of the rubber tube 2.

Figure 4:
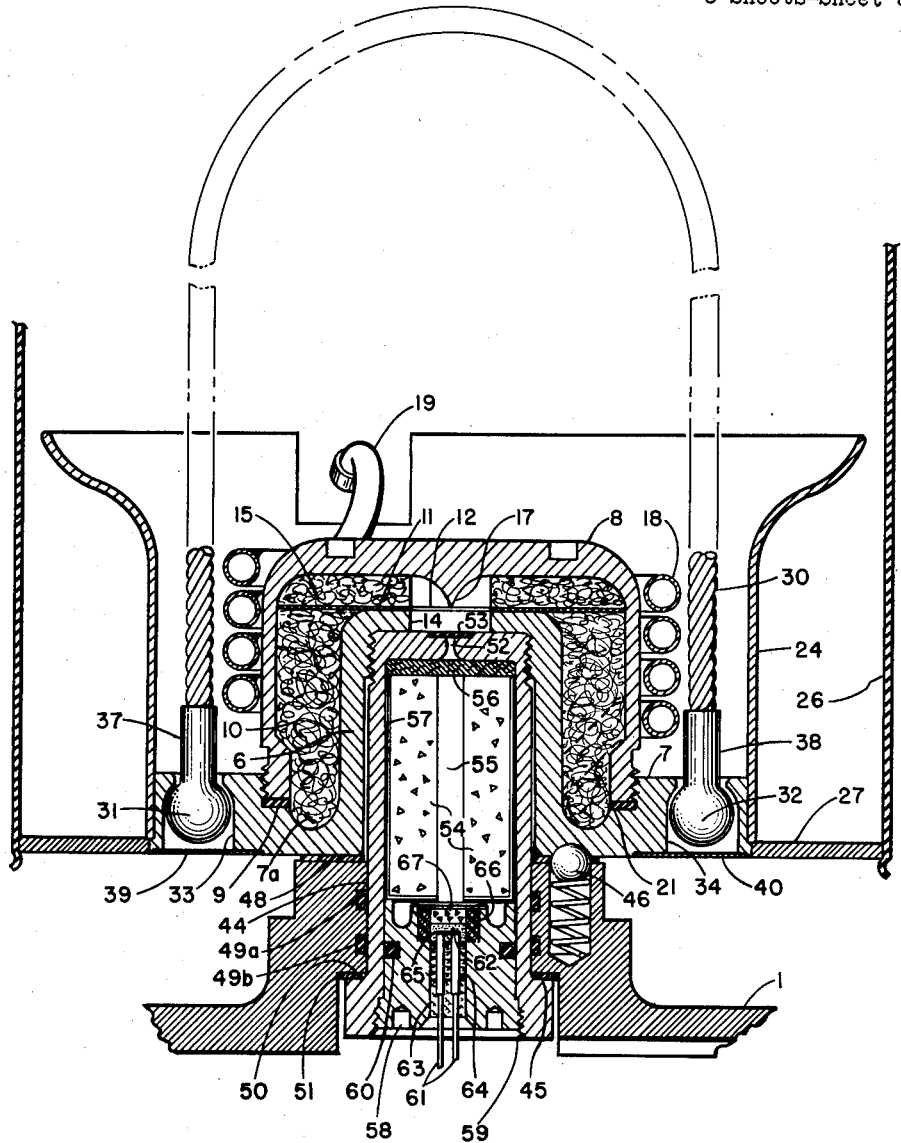
FIGURE 4 is a view taken along the line 4—4 in FIGURE 2, with a squib in place.
Figure 5A:
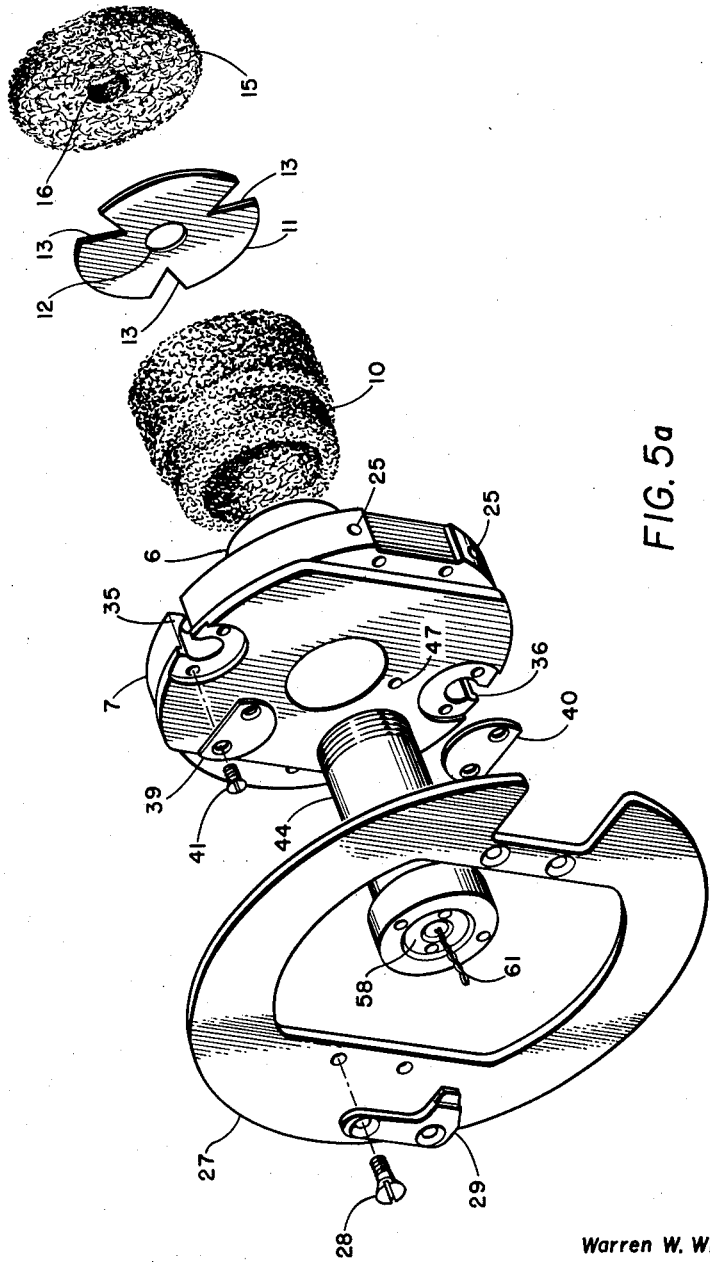

The hypocycloidal form of cone 17 can be more clearly seen in FIGURE 4. The cone 17 can be produced by revolving the lower half of a hypocycloid about its central ordinate axis. A preferred hypocycloid is generated by a point of a moving circle of radius $b$ equal to one quarter the radius $a$ of a larger circle, the smaller circle rolling on the interior of the larger circle in the usual X—Y plane. The Cartesian equation for this hypocycloid is $$x^{2/3} + y^{2/3} = a^{2/3}$$

for example, and its parametric equations are $x = a \cos^3 \theta$ and $y = a \sin^3 \theta$, where $\theta$ is measured counterclockwise from the abscissa or X axis. The lower half of the hypocycloid thus generated can be revolved about its Y axis to form the cone 17, the sharp tip of which can be filed flat or otherwise blunted. An exceptionally efficient lateral deflection and even distribution of discharging gas is possible with this hypocycloidal cone.

The dome 8 and housing 6 are preferably fabricated from steel. A relatively thin copper gasket 21 (FIGURE 4), ring shaped and malleable, provides a seal between the bottom rim of the dome 8 and shoulder ledge 9 around the flange base 7, as the dome 8 is threaded and tightened to the base 7. A small vent 22 (FIGURES 2 and 3) is produced by a countersunk hole which is drilled radially through the thickness of the flange base 7, the inner end of the hole piercing the groove 7a around the outside base of the housing 6. The larger diameter (countersunk) portion of the hole is threaded to accommodate a headless screw plug 23 as indicated in FIGURES 2 and 3. When the end of screw plug 23 is tightened against the inside shoulder of the countersunk hole, a seal is provided which prevents exit of gas to the atmosphere through the vent 22.

A hub 24 is secured around the flange base 7 by screws which thread into holes 25. The rubber tube 2 in turn is secured to the hub 24 and when deflated is stored (packed) in the space between the hub 24 and an outside cover 26 shown in FIGURE 4. A ring disc plate 27 having a central opening shaped to fit over the bottom of the housing 6 (which has two milled end segments) so that the ring plate 27 will be flat with the bottom of the housing 6, is secured thereto by screws 28. A flat key 29 aids in restraining the two parts level. In use, a catapult ram plunger (not shown) presses down on the top of dome 8, separating the locator beacon unit from the cover 26. This ejects the unit from the aircraft and starts the entire sequence of events described previously. When the tube 2 is fully inflated, however, it is impossible to reach and loosen the coupling nut 19, especially in the more compact embodiments of the locator beacon. Screw plug 23 must then be loosened or unscrewed from the shoulder to deflate the tube 2 and permit access to the coupling nut 19. In packing operations, particularly, the screw plug 23 is completely removed and a vacuum line is connected to the hole to completely deflate the tube 2.

A bail 30 is provided in the form of a cable having swaged balls 31 and 32 on the two ends. Two holes 33 and 34 each having tapering sides narrowing near the top (FIGURE 4) are located diametrically opposite in the flange base 7. Slots 35 and 36 are respectively cut in the extreme sides of the holes 33 and 34 to provide gaps just wide enough to pass sleeves 37 and 38 or the cable of bail 30. Thus, the cable is passed sideways between the slots 35 and 36 and the swaged balls 31 and 32 pulled up into the holes 33 and 34, respectively. The holes 33 and 34 taper narrowly, curving in near the top to conform with the shape of the swaged balls 31 and 32. Openings are left at the top for the cable but which do not permit through passage of the balls 31 and 32. Small cover plates 39 and 40 (FIGURES 2, 3 and 4) are secured by screw pairs 41 and 42 in slightly recessed areas around the lower ends of the holes 33 and 34 to keep the swaged balls 31 and 32 in place. The cover plates are secured flat with the bottom of housing 6.

The body of the locator beacon 1 is attached and connected to the flotation section by means of squib 44 which has a generally cylindrical body and a lower flange providing a shoulder 45. A ball bearing detent 46 engages a hemispherical depression 47 (FIGURE 2), through a plastic gasket 48 having a suitable hole therein, and serves to orient the body of the locator beacon correctly. Silicone rubber O-rings 49a and 49b provide a seal against any gas leakage downwards past the threads at the upper end of the squib 44 which engage with the internal threads at the upper end of housing 6. As the squib 44 is drawn upwards by the upper threads of housing 6, the shoulder 45 abutting the neck ledge 50 of the beacon body, of course, forces the body of the locator beacon 1 up against the bottom of housing 6. A small plastic ring gasket 51 is provided between the shoulder 45 and the neck ledge 50.

The squib 44 is a small steel cylindrical container which is closed at the top end except for a small central discharge orifice 52 which is normally covered and sealed with a thin aluminum foil disc 53 cemented over it in a slightly recessed area. The container is packed with approximately 24 grams of type X–9 rocket propellant in the form of a cylindrical slug 54 having an axial tunnel 55 running up the center. A cardboard disc pad 56 forms the top of the slug 54 and effectively provides a space established by the disc thickness when the slug 54 is packed tightly against the top of the squib 44. The remaining surface of the slug 54 is covered with a plastic inhibitor 57 except over the opening of tunnel 55. The slug 54 is forced into position by means of the igniter header 58 which is threaded at the lower end to engage with the lower internal threads 59 of the squib 44. An O-ring 60 is provided about midway up the length of the igniter header 58 to prevent gas from escaping backwards.

The header 58 is shaped as shown in FIGURE 4 and has a central passage through which leads 61 connect with a resistance heater element 62. The leads 61 are potted in ceramic 63 and cement 64 such that the heater element 62 is suspended and immersed in primer 65. A few grains of propellant are located directly above the primer material 65. Both the primer material 65 and the few grains of propellant are contained and surrounded by a cylindrical plastic inhibitor 66 which is covered by a very thin aluminum foil disc 67, forming an igniter pellet. The igniter pellet is located directly beneath the opening of tunnel 55 as illustrated in FIGURE 4.

Operation of the gas generator begins with the application of, for example, a 10 volt pulse of approximately 10 milliseconds duration on the leads 61. Resistance element 62 causes combustion of primer 65 which, in turn, ignites the few grains of propellant directly above it. The foil 67 is quickly ruptured, as is the resistance element 62, and flames and heat shoot up the tunnel 55, localizing at the top and igniting pad 56. The slug 54 burns from the top down for about 1¼ seconds. The foil disc 53 is blown apart and gas is emitted from orifice 52. The plastic inhibitor 57 around the slug 54 prevents burning from starting at the bottom of the slug 54.

The approximately 24 grams of type X–9 rocket propellant produces approximately 1100 cubic inches of gas. A mole of type X–9 propellant will produce, by weight, the following gases as listed.

| | Percent |
|---|---|
| $H_2$ | 20.67 |
| $H_2O$ | 16.53 |
| $CO$ | 44.06 |
| $CO_2$ | 9.03 |
| $N_2$ | 9.71 |

Gas temperatures of about 3000° F. at about 1500 p.s.i.g. are produced in the squib 44. The hot gas streams through the venturi throat and out the orifice 52. The gas discharges out opening 14 and passes through the housing opening 12 of baffle 11 and is split and deflected by the hypocycloidal cone 17 and directed evenly into copper wool pad 15. The hot gas moves laterally through pad 15 and actually fuses some of the copper wool, and then passes through the peripheral sector notches 13 in the copper baffle 11 down into the packed copper wool 10 which is also partly fused by passage of the hot gas. Pressure in the dome drops to about 500 p.s.i.g. and gas temperature to about 1500° F.

The cooled gas collecting at the bottom in groove 7a is picked up by the lower end opening 18a of copper tubing 18 and is further cooled as it passes through the coils and finally discharges into the rubber tube 2 through the air valve in valve jacket 20 of tube 2. The gas at this stage has been cooled to approximately 200° F. and the pressure has dropped to approximately 5 p.s.i.g. in the rubber tube 2. The rubber tube 2 is accordingly inflated at a suitable pressure and at a cool temperature which does not harm the rubber tube 2. It is possible to cool the gas substantially more just by adding a few more turns of the copper tubing 18 and the gas can be used to inflate almost any kind of material. Of course, the bulk of cooling performed was accomplished by the copper wool within the dome 8. Low outside atmospheric temperatures do not affect the gas generator because of the high burning temperature inherent within the squib 44.

The volume of gas generated is determined principally by the amount of propellant placed in the squib 44. Thus, it is extremely easy to vary the amount of gas produced from the gas generator. The temperature drop, in the above instance, from about 3000° F. to 200° F. was very great, considering the compactness of the device and its speed in delivering gas to the rubber tube 2. The pressure drop for the small volume dome was also considerable. It should be noted that the lack of a gas generator which could supply sufficiently cool gas to inflate rubber articles and the like has long delayed the completion of a workable crash locator beacon. Many attempts and extensive efforts to develop a satisfactory cool gas generator were made by many individuals and concerns, but all have hitherto been unsuccessful. A reliable and compact gas generator which produces a large volume of gas at a useful cool temperature is thus provided.

While some specific values and dimensions have been given, these were noted as examples only. It is to be understood that the particular embodiment of our invention described above and shown in the drawings is merely illustrative of and not restrictive of the broad invention, and that various changes in design, structure and arrangement may be made without departing from the spirit and scope of the broader of the appended claims.

We claim:

1. A compact cool gas generator for inflating a rubber article or the like, comprising: a squib providing a comparatively slow burning source of gas and including means for igniting the same; a housing having a normally upper opening for mounting said squib to discharge gas through the normally upper opening, said housing substantially enclosing said squib and having a normally lower flange base; a dome structure enveloping said housing in circumferentially spaced relationship therefrom and having a normally lower open end secured to the normally lower flange base of said housing; heat absorbent material of high specific heat packed in space between said housing and said dome structure for absorbing heat from the discharge gas; means for distributing squib discharge gas evenly through said heat absorbent material including a hypocycloidal cone positioned with apex directly in the discharge path of gas emanating from the normally upper opening of said housing to deflect gas uniformly into said heat absorbent material, and heat absorbent baffle means of high specific heat interspersed in said heat absorbent material to further distribute the gas evenly; and outlet means connecting with said dome structure.

2. The invention according to claim 1 wherein said hypocycloidal cone is dependent from said dome structure directly over said normally upper opening of said housing, said hypocycloidal cone having a surface of revolution according to a Cartesian equation of $x^{2/3}+y^{2/3}=a^{2/3}$, where $a$ is a constant, and $x$ and $y$ are Cartesian coordinates.

3. A compact and cool gas generator, comprising: a squib providing a comparatively slow burning source of gas; a housing for mounting said squib and having an opening to discharge gas from said housing in a fixed direction; a dome structure secured to said housing and substantially enclosing the same; heat absorbent material of high specific heat packed in space between said housing and said dome structure; means for distributing squib discharge gas evenly through said heat absorbent material, said distributing means including a cone positioned with apex directly in the discharge path of gas emanating from the opening of said housing to deflect gas uniformly into said heat absorbent material, and baffle means interspersed in said heat absorbent material to further distribute the gas evenly; and outlet means connecting with said dome structure.

4. The invention according to claim 3 wherein said outlet means includes a length of heat absorbent tubing of high specific heat encircling said dome structure and connecting with said dome structure at a point providing a maximum travel of discharge gas passing through said heat absorbent material from said housing.

References Cited in the file of this patent

UNITED STATES PATENTS

| 2,061,742 | Swart | Nov. 24, 1936 |
| 2,494,131 | Jackson et al. | Jan. 10, 1950 |
| 2,558,756 | Jackson et al. | July 3, 1951 |
| 2,775,511 | Geffroy | Dec. 25, 1956 |

FOREIGN PATENTS

| 858,414 | Germany | Dec. 8, 1952 |
| 47,445 | Austria | Apr. 10, 1911 |